United States Patent [19]
Kita et al.

[11] Patent Number: 5,636,290
[45] Date of Patent: Jun. 3, 1997

[54] COLOR IMAGE PROCESSING

[75] Inventors: Shinji Kita; Hitoshi Ogatsu; Kazumasa Murai, all of Kanagawa, Japan

[73] Assignee: Fuji Xerox Co., Ltd., Tokyo, Japan

[21] Appl. No.: 667,883

[22] Filed: Jun. 20, 1996

Related U.S. Application Data

[63] Continuation of Ser. No. 371,574, Jan. 12, 1995, abandoned, which is a continuation of Ser. No. 138,446, Oct. 20, 1993, abandoned.

[30] Foreign Application Priority Data

Sep. 10, 1993 [JP] Japan ................................. 5-248476

[51] Int. Cl.$^6$ ........................................... G06K 9/00
[52] U.S. Cl. ..................... 382/167; 382/156; 382/158; 358/518; 358/519
[58] Field of Search ........................... 382/162, 167, 382/156, 157, 158; 358/518, 519, 520, 523, 515; 348/453

[56] References Cited

U.S. PATENT DOCUMENTS

| | | |
|---|---|---|
| 4,500,919 | 2/1985 | Schreiber . |
| 4,740,833 | 4/1988 | Shiota et al. ............... 358/518 |
| 5,032,904 | 7/1991 | Murai et al. ............... 382/17 |
| 5,105,267 | 4/1992 | Hayashi ............... 358/515 |
| 5,162,899 | 11/1992 | Naka et al. ............... 382/17 |
| 5,386,496 | 1/1995 | Arai et al. ............... 358/518 |

FOREIGN PATENT DOCUMENTS 4-188956 7/1992 Japan .

*Primary Examiner*—Leo Boudreau
*Assistant Examiner*—Phuoc Tran
*Attorney, Agent, or Firm*—Finnegan, Henderson, Farabow, Garrett & Dunner, L.L.P.

[57] ABSTRACT

A first nonlinear conversion section converts input color signals of a kind that is one of plural, different kinds to L*a*b* signals. A second nonlinear conversion section converts the L*a*b* signals to image recording signals of four colors including black. The first nonlinear conversion section includes an input judgment device for judging the kind of input color signals, a weight memory for storing weights for the respective kinds of color signals, and a nonlinear conversion circuit. The weights corresponding to the kind of input color signals identified by the input judgment device are read from the weight memory and set in the nonlinear conversion circuit. The first nonlinear conversion section further has a learning device to accommodate color signals whose conversion relationship with the L*a*b* signals has not been defined.

15 Claims, 10 Drawing Sheets

FIG. 2

| APPLICATION | KIND | COLOR SPACE | COLOR MATCHING | INPUT FILE | OUTPUT FILE | SPECIAL FUNCTION |
|---|---|---|---|---|---|---|
| Illustrator 3.2 | ILLUSTRATION | CMYK | PANTONE TOYO DIC | EPS (MacDraw/II) | EPS | GRAPH GENERATION |
| FreeHand 3.1 | ILLUSTRATION | RGB HSL CMY CMYK | PANTONE TOYO DIC | EPS TIFF PICT MacPaint | EPS | AUTOMATIC GRADATION INSERSION OF POSTSCRIPT PROGRAM |
| PhotoShop 2.01 | IMAGE EDITION | Gray RGB CMYK HSL HSB | PANTONE TRUEMATCH FOCOLTONE DIC TOYO | GIF EPS MacPaint PICT PIXAR TIFF | EPS PICT PIXAR TIFF | PLUG-IN EXTENSION |
| PageMaker 3.5J | PAGE LAYOUT | RGB HSL CMYK | PANTONE | MacPaint PICT EPS TIFF | | ENLARGEMENT/ REDUCTION PRINTING MINIATURIZATION PRINTING |

INPUT — OUTPUT

INPUT
OUTPUT

THRESHOLD THRESHOLD
OUTPUT

OUTPUT

COLOR IMAGE PROCESSING

This application is a continuation of application Ser. No. 08/371,574, filed Jan. 12, 1995, now abandoned, which was a continuation of application Ser. No. 08/138,446 filed Oct. 20, 1993, now abandoned.

BACKGROUND OF THE INVENTION

The present invention relates to a color image processing method and apparatus for converting three color signals received from a color image input device or a color image generation device to color image recording signals of four colors including black. More specifically, the invention relates to a color image processing method and apparatus for producing a desired print output from various types of color signals.

In conventional color printers, color copiers, etc., color conversion processing is performed so as to conform to the color reproduction characteristics of a subject recording device by restricting input colors. For example, in a color copier which incorporates an input device, a print output is produced from a particular input document and color conversion processing from input color signals to recording color signals is performed so that the print output color coincides with the document color. On the other hand, in a color printer, a color conversion process from input color signals to recording color signals is set with an assumption (restriction) that certain representative signals are input. In general, the representative input signals are NTSC RGB television signals. The color coincidence between a display and a print output is attained by properly setting a conversion process from the NTSC RGB signals to recording signals of cyan, magenta, yellow and black.

However, now, a variety of color input and output media are used and color signals are exchanged between those media through a network, and color signals are diversified accordingly. For example, this situation is reflected in the types of application software for editing color image information. FIG. 2 shows specifications of color expression in typical pieces of application software. All of the following color spaces can be used: (1) RGB space, (2) HSL and HSB spaces defined by operations of modifying the RGB space, and (3) CMYK space using recording colors themselves. In general, where the final outputs are printing outputs, CMYK signals are used which are sent to a plate making scanner for printing.

It is a commonly known case that, even if the same color space is used, actual color data are different. For example, the RGB signals of general color scanners are different from the NTSC RGB signals. Further, the RGB signals are different among a plurality of color scanners because of differences of spectral responses, for instance. Similarly, on the CMYK space, even if the same CMYK signals are used, different sets of colorants produce different print colors. That is, other than the color space, there exists an indicator of whether the color signals depend on devices. The "device-independent" signals mean signals which are convertible to signals on a colorimetric color coordinate space (e.g., CIE XYZ, L*a*b* and L*u*v*) according to known definitive equations. The NTSC RGB signals are device-independent signals. Conversely, the "device-dependent" signals are signals which are set assuming characteristics of a particular device. The CMYK signals and the RGB signals of color scanners are device-dependent signals. To process device-dependent signals with another type of device, it is necessary to describe some corresponding relationship between the device-dependent signals and device-independent signals. Examples of those relationships are shown in FIG. 2 in the column of color matching, which gives color coordinates for plural points of CMYK signals. As shown in FIG. 2, there exist a plurality of color matches in association with the kinds of printing inks, etc.

Even now, there has not been proposed a color conversion process which can process a number of kinds of input color signals independently of the kinds to provide faithful reproduction. One method of realizing such a process by use of approximation is such that in a known matrix-type color conversion process, plural sets of conversion coefficients are prepared for different kinds of input color signals and switched in accordance with the kind of input color signals. However, this method cannot provide sufficient color reproduction accuracy because of nonlinearity of recording devices, and cannot extend the conversion in a simple manner for input color signals of four colors such as CMYK signals.

A direct look-up table type color conversion method is known as a method of providing more faithful reproduction. However, to apply this method to a number of kinds of input color signals, conversion tables of the number of kinds of input color signals need to be stored, which increases the memory cost. Further, like the above matrix type conversion method, in the case of input color signals of four colors such as CMYK signals, the memory size and the size of interpolation operation become so large as to disable simple extension of the conversion.

SUMMARY OF THE INVENTION

An object of the invention is to provide a color conversion processing method and apparatus which can process plural kinds of input color signals independently of the kinds to provide faithful reproduction, and which, in particular, can accommodate input color signals of four colors such as CMYK signals as well as input color signals of three colors such as RGB signals and signals modified therefrom, to provide faithful reproduction.

Another object of the invention is to provide a color image processing method and apparatus which can perform correct color reproduction even with a high UCR (under color removal) ratio to thereby improve gray balance of photographic images and quality of black characters.

A further object of the invention is to provide a color image processing method and apparatus which generates color conversion coefficients in a self-multiplying manner even for input color signals whose conversion relationship with device-independent signals (on a colorimetric color coordinate space) has not been defined by learning the conversion relationship based on color matching data associated with the input color signals.

A still further object of the invention is to provide a high-speed color image processing method and apparatus which attains the above objects with a smaller size circuit configuration by performing part or all of operations using a combination of a plurality of nonlinear operation units.

According to the invention, a color image processing apparatus comprises:

first converting means for determining conversion characteristics based on a relationship between input color signals and uniform color signals on a uniform color space, and for converting the input color signals to the three uniform color signals, the input color signals being of a kind that is one of plural, different kinds; and second converting means for converting the three uniform color signals to image recording signals of four colors including black.

With the above constitution, the first converting means converts the input color signals of a kind that is one of plural, different kinds received from a color image input device, color image generation device, etc. to the three color signals on the iso-perceptive, uniform color space, for instance, to 1976 CIE L*a*b* signals. As shown in the Japanese Industrial Standards (JIS) Handbook "Shikisai (Color)-1992", page 27, row #2065, "uniform color space" is a color space in which the aim is for color differences that are perceived to be of equal magnitude to correspond to equal distances in the space. CIE determined the 1976 CIE L*a*b* color space to be one of the uniform color spaces, as shown at row #2068 on the same page. It uses the following three-dimensional rectangular coordinates:

$$L^* = 116 \left( \frac{Y}{Y_n} \right)^{\frac{1}{3}} - 16 \quad \frac{Y}{Y_n} > 0.008856$$

$$a^* = 500 \left[ \left( \frac{X}{X_n} \right)^{\frac{1}{3}} - \left( \frac{Y}{Y_n} \right)^{\frac{1}{3}} \right] \quad \frac{X}{X_n} > 0.008856$$

$$b^* = 200 \left[ \left( \frac{Y}{Y_n} \right)^{\frac{1}{3}} - \left( \frac{Z}{Z_n} \right)^{\frac{1}{3}} \right] \quad \frac{Z}{Z_n} > 0.008856$$

By performing the conversion (color correction, black addition, under color removal, etc.) to the recording signals using the above color signals, the process well matches the human perception and can be generalized so as not to depend on the characteristics of the image input device. To accommodate plural kinds of color signals (see FIG. 2), the conversion characteristics are defined in advance for the respective kinds of color signals and stored in a memory means. An input judgment means judges the kind of input color signals, and the corresponding conversion characteristics are read from the memory means and stored in a nonlinear conversion circuit. For the input color signals whose conversion relationship with the uniform color space has not been defined, the conversion coefficients are automatically generated by self-learning (sequential multiplication) based on a plurality of reference data that are received prior to the input of the color signals. This constitution enables the color conversion apparatus to accommodate not only the preset plural kinds of color signals but also color signals of future color image devices. Although the above advantages can be secured with any types of second converting means which convert the three color signals on the uniform color space to the image recording signals of four colors including black, the following advantages can further been obtained if an UCR ratio obtained from a chroma signal is added as another input of the conversion, to provide a 4-input/4-output configuration.

In the second converting means, the chroma signal C* is generated based on the chromaticity signals according to its definition ($\{(a^*)^2+(b^*)^2\}^{1/2}$ for the L*a*b* signals), and the UCR ratio is determined according to the function that has been preliminarily set in an adjustable manner. In general, the UCR ratio should be set at 0 in a middle chroma range where memory colors such as a skin color, grass green and sky blue are located, because in that range the inclusion of black likely causes a rough image. On the other hand, to prevent a gray portion from being colored because of instability of a recording device, a gray portion needs to be reproduced singly by black (the UCR ratio is 1). Considering the above, in general, the UCR ratio function is so set as to decrease monotonically with the increase of the chroma.

Further, it is necessary to change the UCR ratio with the kind of input image. For example, the input image is a precise still life, the texture can be improved by increasing the UCR ratio over the entire image. On the other hand, for an image including a human as the main feature, such as a portrait, it is important to suppress roughness by decreasing the UCR ratio. Therefore, the UCR ratio should be set not in a fixed manner but in an adjustable manner. The number of adjusting parameters is limited to simplify the adjustment.

Then, in the second converting means, the color output signals of cyan, magenta, yellow and black are determined from the UCR ratio and the three uniform color signals (e.g., L*a*b* signals). Since this Operation is a four-input/four-output operation, the output color signals are uniquely determined. Therefore, the four output color signals satisfy faithful reproduction in a colorimetric sense with respect to the input color, and the invention is free from the problem of the conventional apparatus that the black addition and under color removal after the determination of three color output signals may prevent faithful reproduction depending on the color allocation. Further, since the four color output signals are output in a parallel manner, the apparatus of the invention can be practiced with a tandem-type recording device which records an image of the four color signals in a parallel manner (the ink jet type and electrophotographic type are presently available).

In summary, the invention provides the color conversion process which can accommodate plural, different kinds of input color signals. In particular, with the constitution which can even accommodate, by self-learning, input color signals whose conversion relationships with a colorimetric color coordinate system are not defined, it becomes possible to connect to various color image devices that are or will be put into practice in a wide range of technical fields, to thereby enable desired color reproduction required by various color image devices. With the constitution which enables the UCR adjustment for image quality improvements (e.g., improvement of texture, stabilization of gray reproduction and reduction of graininess of memory colors) taking into account the characteristics of a recording device, it becomes possible to improve the output image quality itself as well as assure faithful color reproduction. By virtue of the use of three iso-perceptive color signals on a uniform color space, every processing step is constructed to be device-independent and is performed using iso-perceptive lightness/chromaticity separation signals that well match the human perception. Therefore, the invention can be applied to a variety of image recording devices irrespective of their types and necessary adjustments are performed in a manner compatible with the human perception.

BRIEF DESCRIPTION OF THE DRAWINGS

FIG. 2 is a table showing various kinds of color image signals used in application software of workstations;

DESCRIPTION OF THE PREFERRED EMBODIMENTS

Embodiments of the present invention are described hereinafter with reference to the accompanying drawings.

Figure 1:
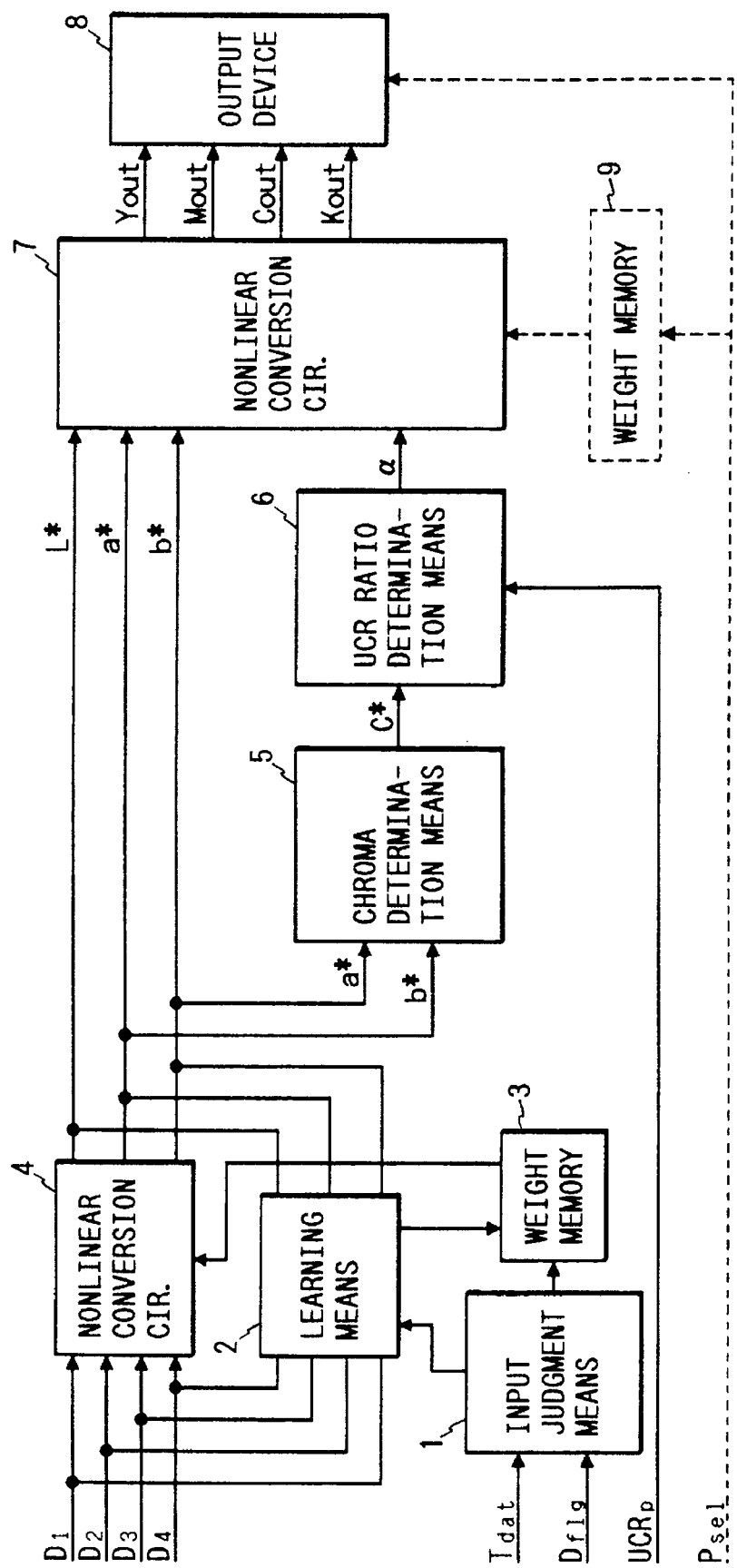
FIG. 1 is a block diagram showing the entire constitution of a color image processing apparatus according to an embodiment of the present invention.

FIG. 1 shows the constitution of a color image processing apparatus according to an embodiment of the invention. Input image signals are assumed to be signals of application programs of color workstations and personal computers as shown in FIG. 2. The input signals consist of color image signals $D_1$–$D_4$ of four colors or less, data $D_{fg}$ indicating the kind of color data, and reference data $T_{dat}$ indicating a corresponding relationship with device-independent signals. The data $D_{fg}$ and the reference data $T_{dat}$ are input to an input judgment means 1 prior to the input of the color image signals $D_1$–$D_4$. The input judgment means 1 compares the data $D_{fg}$ with a preset list of input signals. If a coincident number is found in the list, a content of a weight memory 3 having that number as its address is set in a nonlinear conversion circuit 4. If no coincident number is found, the input judgment means 1 forwards the reference data $T_{dat}$ to a learning means 2 to learn weight coefficients for nonlinear conversion (described later). The data $D_{fg}$ and the weight coefficients are newly registered in the weight memory 3, and the weight coefficients are set in the nonlinear conversion circuit 4.

The nonlinear conversion circuit 4 converts the color image signals $D_1$–$D_4$ of four colors or less to "isoperceptive" (a distance between two points on a coordinate system is proportional to a perceptual color difference) lightness/chromaticity signals. Specifically, in this embodiment, the 1976 CIE L*a*b*, which are of such signals, are employed as output signals of the nonlinear conversion circuit 4.

Of the {L*, a*, b*} signals output from the nonlinear conversion circuit 4, the {a*, b*} signals are input to a chroma determination means 5, which calculates a chroma signal C* according to the definition $$C^*=\{(a^*)^2+(b^*)^2\}^{1/2} \quad (1)$$

and outputs the result.

Figure 3:
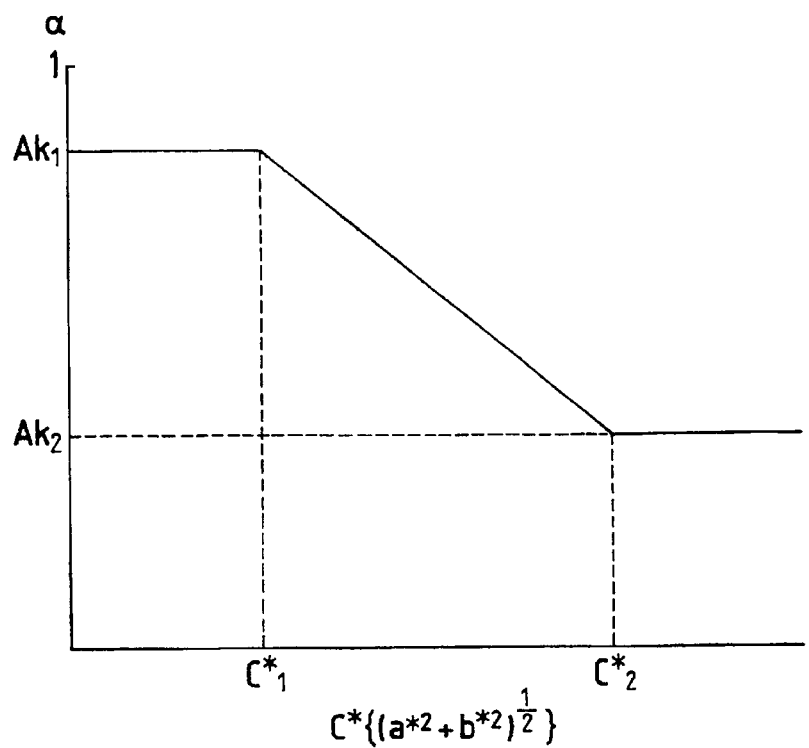
FIGS. 3 and 4 are graphs showing functions to determine an UCR ratio.

The chroma signal C* is input to an UCR ratio calculation means 6, which determines an UCR ratio $\alpha$ by an operation using parameters supplied externally. As shown in FIG. 3, the parameters are given as two points (C*$_1$, Ak$_1$), (C*$_2$, Ak$_2$) on a C*–$\alpha$ coordinate system. A relationship Ak$_1$ >Ak$_2$ holds in general and, to reproduce gray singly by black, it is desired that Ak$_1$ be equal to 1.

The parameter C*$_1$ is set considering the gray reading accuracy in processing the input signals. In particular, the parameter C*$_1$ is set based on a C* error when a black thin line of an image is read and converted to {L*, a*, b*} signals. The parameter C*$_2$ serves to limit the use of black, and is determined considering a chroma distribution of a memory color such as the human skin color. This is to prevent a case where black is used to reproduce a human skin color and some graininess is caused. Based on the above considerations, in the invention, the default parameters are set as follows:

$C^*_1=10$ $Ak_1=1$ $C^*_2=30$ $Ak_2=0 \quad (2)$

In the invention, since the UCR adjusting parameters are determined only from two coordinate points, they can easily be adjusted only by changing the two points independently within the ranges $0 \leq Ak \leq 1$ and $0 \leq C^*$. In general, this adjustment is performed in link with such adjusting mechanisms as a density/color adjustment and a sharpness adjustment, and is specifically effective in adjusting the texture of reproduced images in accordance with the kind of a document.

Figure 4:
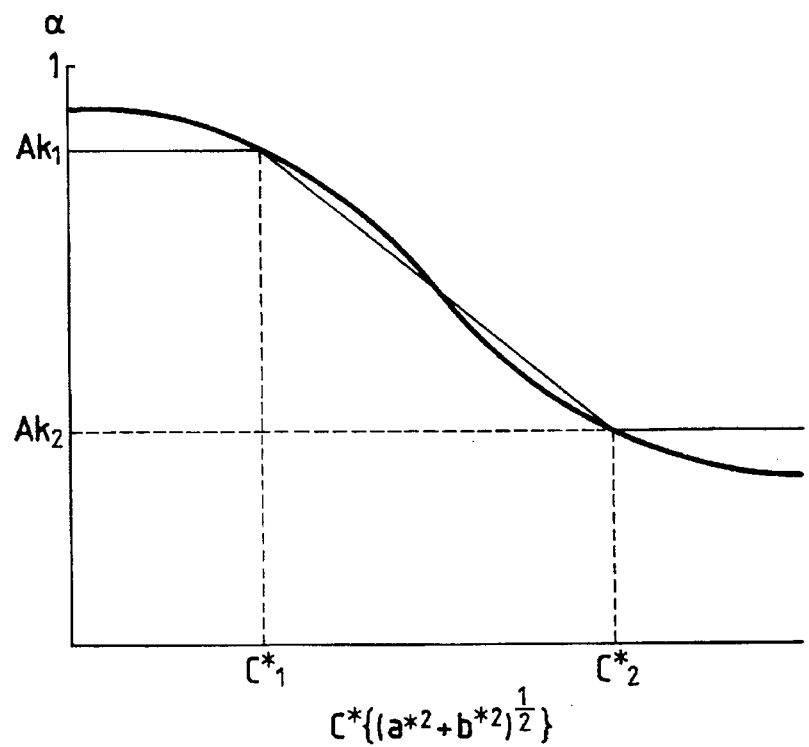

There may be employed two types of functions. The first type is a polygonal line function as shown in FIG. 3. In this case, using the adjusting parameters (C*$_1$, Ak$_1$), (C*$_2$, Ak$_2$) the UCR ratio $\alpha$ is expressed as follows:

$\alpha=Ak_1$ for $C^*<C^*_1$ $\alpha=(C^*-C^*_1)(Ak_2-Ak_1)/(C^*_2-C^*_1)+Ak_1$ for $C^*_1 \leq C^* < C^*_2$ $\alpha=Ak_2$ for $C^*_2 \leq C^* \quad (4)$ The second type is a monotonic, saturation-type continuous function as shown by a thick line in FIG. 4. In this case, using the adjusting parameters (C*$_1$, Ak$_1$), (C*$_2$, Ak$_2$) the UCR ratio $\alpha$ is expressed as follows:

$\alpha=Ak_2+(Ak_1-Ak_2)[1-\tan h\{(\pi/2)(C^*-a)/b\}]/2 \quad (5)$ where $a=(C^*_1+C^*_2)/2$ $b=(C^*_2-C^*_1)/2$.

The UCR ratio $\alpha$ is fixed at 1 when Eq. (5) takes a value larger than 1 and at 0 when it takes a negative value.

Which function type is desirable depends on the constitution of a nonlinear conversion circuit 7 that is provided at the next stage. The first type is suitable for a direct look-up table type color conversion circuit. This is so because the direct look-up table type conversion is a polygonal line type conversion on a color space in which conversion outputs for representative points on the color space are stored in the form of a table and outputs for arbitrary inputs are determined by linear interpolation on representative points in the vicinity of the inputs.

On the other hand, the second type is suitable for the nonlinear conversion circuit 7 (described later) of the invention, because the nonlinear conversion circuit 7 is a combination of conversion elements which exhibit continuous and differentially continuous characteristics. In this case, it is desired that a function for the UCR ratio be defined as also being continuous and differentially continuous.

Although in the embodiment Eq. (4) is used in the UCR ratio calculation means 6 for the above reason, the invention is not limited to Eq. (4) but may employ any proper function types.

The UCR ratio $\alpha$ output from the UCR ratio calculating means 6 and the {L*, a*, b*} signals output from the nonlinear conversion means 4 are input to the nonlinear conversion circuit 7, which produces four output color signals of cyan, magenta, yellow and black. Being a 4-input/4-output conversion, this conversion is performed uniquely. In the above steps, the input image signals, which are based on one of various color definitions, are converted to output signals of four colors of the recording system while the colorimetric reproduction capability is maintained. In the above process, the black signal is controlled to provide a highest output image quality.

In the following, the constitution of the nonlinear conversion circuits 4 and 7 of this embodiment is described in detail. Basically the nonlinear conversion circuits 4 and 7 can have the same constitution, and the following description is directed to such a case. But the invention is not limited to such a case. This nonlinear conversion circuit under discussion is disclosed in Japanese Patent Application No. Hei. 5-85157 filed by the present assignee and entitled "Nonlinear Operation Unit and Information Processing Apparatus Using the Same."

Figure 5:
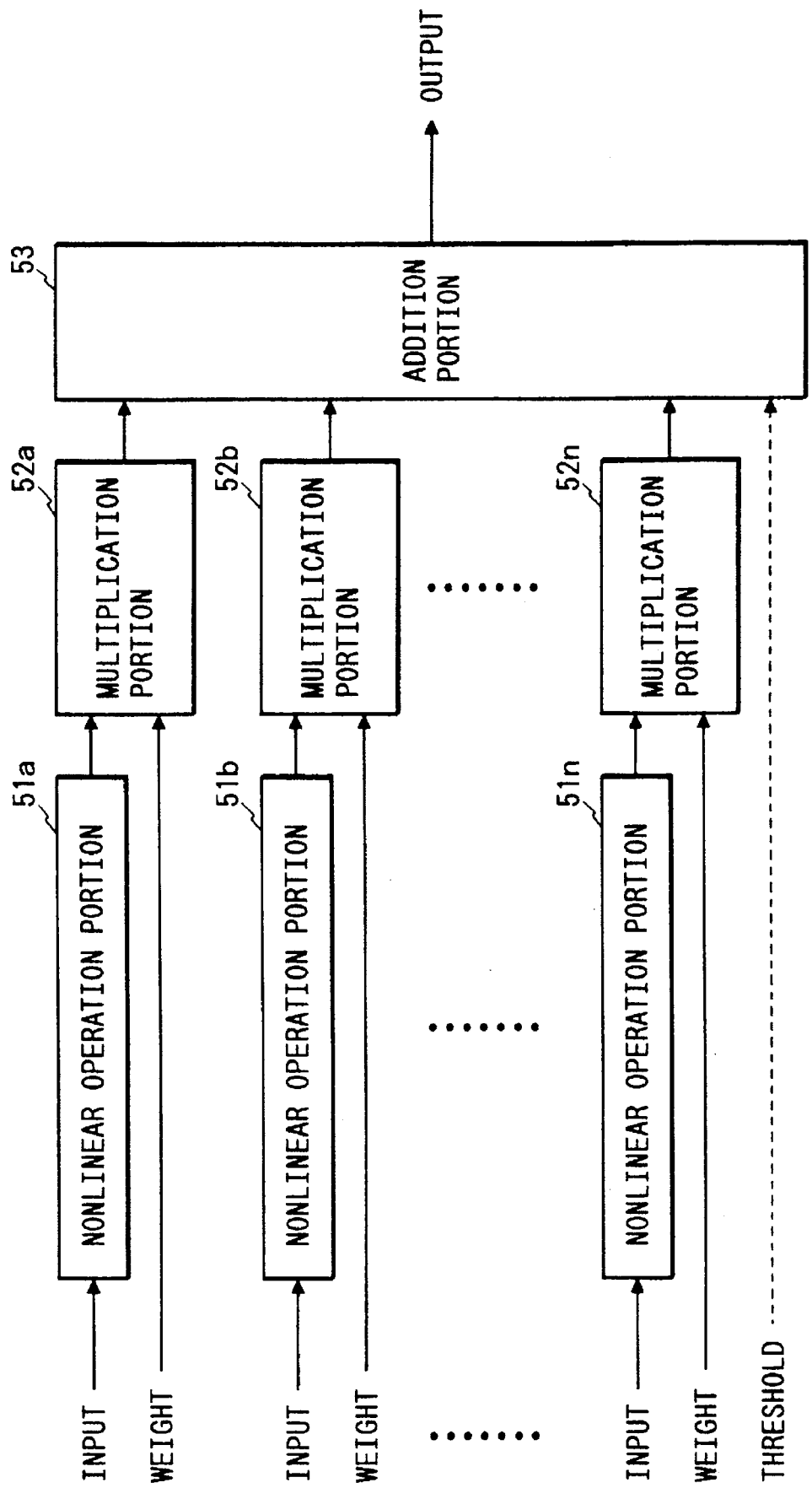
FIG. 5 is a block diagram showing constitution of a nonlinear operation unit used in a nonlinear conversion circuit.

Each of the nonlinear conversion circuits 4 and 7 is constituted of a plurality of nonlinear operation units (see FIG. 5) connected to each other. The nonlinear operation unit of FIG. 5 consists of nonlinear operation portions 51a–51n each for applying a nonlinear function $g(u_j)$ to each of one or more inputs $u_j$, multiplication portions 52a–52n for multiplying the respective outputs of the nonlinear operation portions 51a–51n by weights $w_{ji}$, and an addition portion 53 for adding up the outputs of the multiplication portions 52a–52n and further adding a threshold $\tau_1$ to the resulting sum. The threshold $\tau_i$ may be 0 to simplify the addition portion 53. An output $u_i$ of the nonlinear operation unit i is expressed as $$u_i = \sum_j w_{ji} g(u_j) + \tau_i \quad (5)$$

In the neural network theory, usually an output $x_i$ of each nerve i is expressed as $$x_i = g(u_i) \quad (6)$$

where $u_i$ is an internal potential of the neuron i. The internal potential $u_i$ is expressed as $$u_i = \sum_j w_{ji} x_j + \tau_i \quad (7)$$

where $x_j$ is an output of a neuron, $w_{ji}$ is strength of connection from the neuron j to the neuron i and $\tau_i$ is a threshold of the neuron cell i. Therefore, a conventional circuit configuration that simulates a cell of a neural network performs calculations according to Eqs. (6) and (7). The circuit includes a multiplication portion for multiplying the inputs $x_j$ by the respective weights $w_{ji}$ and an addition portion for adding up the outputs of the multiplication portion, and the nonlinear function $g(u_i)$ is applied to the resulting sum to obtain the output of the circuit.

Whereas the nonlinear operation unit of the nonlinear conversion circuits 4 and 7 of this embodiment has the circuit configuration different than the conventional circuit of simulating a cell of a neural network, when a plurality of nonlinear operation units are combined to constitute a network, they operate equivalently to the conventional circuits for the entire neural network. The above-described configuration of the nonlinear operation unit can be implemented as either a digital circuit or analog circuit. In particular, the analog nonlinear operation unit has smaller errors due to a temperature variation and circuit configuration and is simpler in circuit constitution and higher in processing speed than the conventional circuit simulating a cell of a neural network. Therefore, this embodiment is directed to the case of implementing the nonlinear operation unit as an analog circuit.

In the following, the analog-type implementation of the nonlinear operation unit of the nonlinear conversion circuits 4 and 7 is described in detail. The analog circuit includes differential amplifiers each consisting of a pair of bipolar transistors whose first terminals (emitters) are connected to each other. A voltage difference proportional to an input is applied between the second terminals (bases) of the pair of bipolar transistors that constitute each differential amplifier, and a current proportional to a weight for the multiplication are suitably supplied to the first terminals (emitters). An output of the differential amplifier is obtained at the third terminals (collectors) as a current difference.

Figure 6:
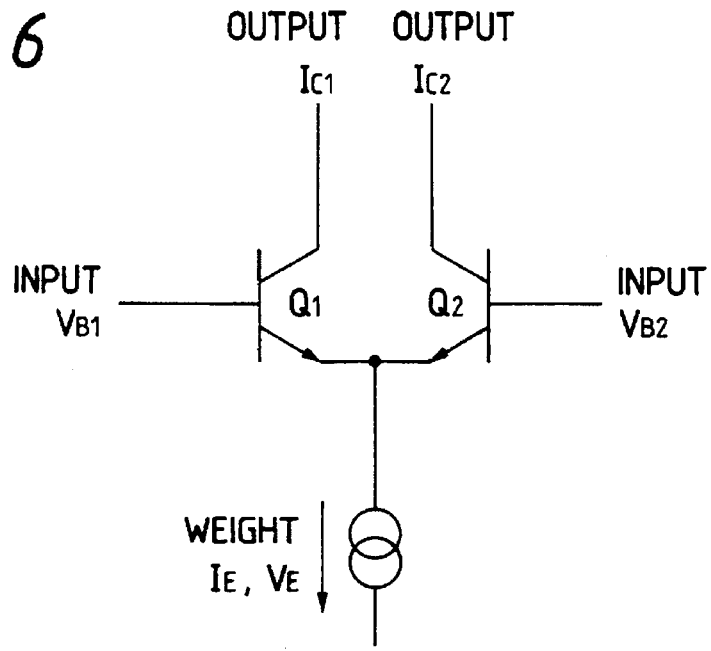
FIGS. 6 and 7 are circuit diagrams showing analog circuits used in the nonlinear operation unit.

FIG. 6 shows a specific example in which bipolar transistors are used. A difference between collector currents $I_{C1}$ and $I_{C2}$ of the respective transistors is $$I_{C1} - I_{C2} = I_E \cdot \tan h\{(V_{B1} - V_{B2})/2V_T\}. \quad (8)$$

That is, in this circuit, the logistic function tanh is applied to the input voltage difference $V_{B1} - V_{B2}$ and the result is multiplied by the weight $I_E$ to produce the output current difference $I_{C1} - I_{C2}$. This circuit has characteristics to provide the above-described function of applying a nonlinear function to the input and multiplying the multiplication result by a proper weight.

Figure 7:
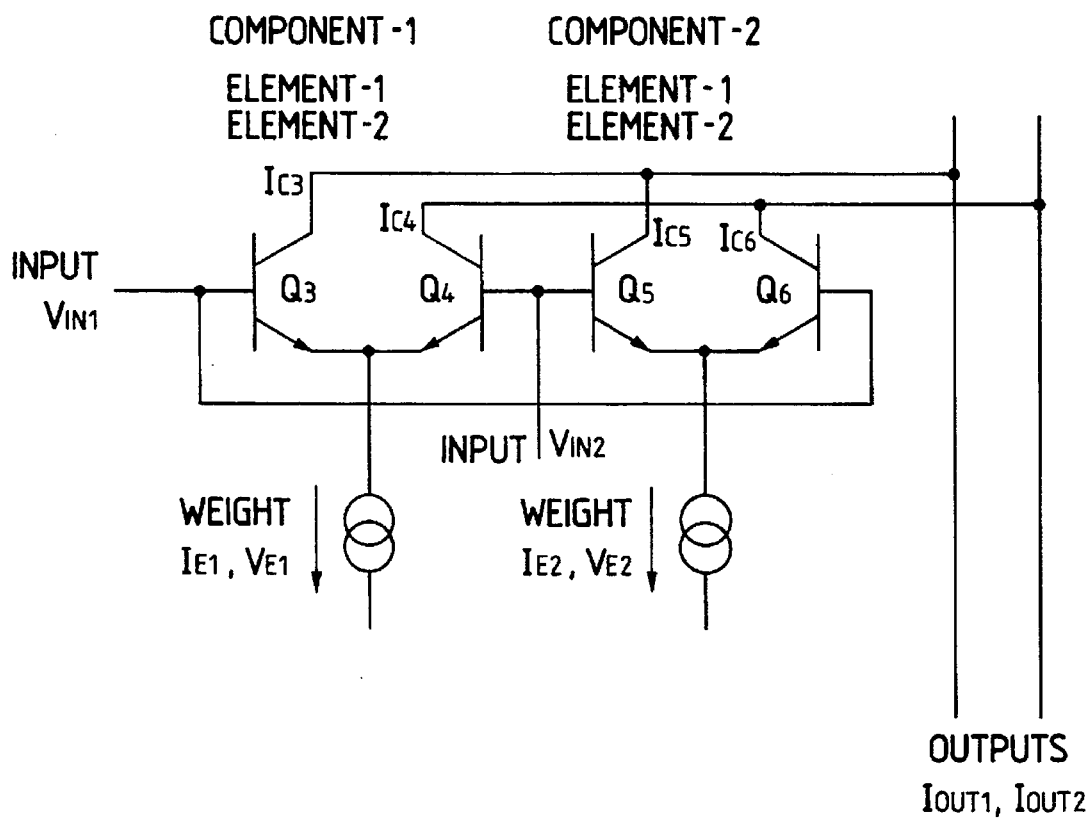

In the case of including positive and negative signs, the nonlinear operation unit has a configuration as shown in FIG. 7 in which the circuit of FIG. 6 is employed as the basic component. The first terminals (emitters) of transistors (element-1 and element-2) of component-1 are connected to each other and the first terminals (emitters) of transistors (element-1 and element-2) of component-2 are connected to each other to form respective differential amplifiers of component-1 and component-2. The second terminals (bases) of the transistor (element-1) of component-1 and the transistor (element-2) of component-2 are connected to each other to form an input terminal for $V_{IN1}$. The second terminals (bases) of the transistor (element-2) of component-1 and the transistor (element-1) of component-2 are connected to each other to form an input terminal for $V_{IN1}$ (This terminal may be grounded). Further, the third terminals (collectors) of the transistor (element-1) of component-1 and the transistor (element-1) of component-2 are connected to each other to form a first output terminal for $I_{OUT1}$. The third terminals (collectors) of the transistor (element-2) of component-1 and the transistor (element-2) of component-2 are connected to each other to form a second output terminal for $I_{OUT2}$.

With the above constitution, when the voltage difference $V_{IN1} - V_{IN2}$ that is proportional to the input and a current difference $I_{E1} - I_{E2}$ that is proportional to the weight are supplied to the circuit, a bounded, monotonic function is applied to the input, and the output $I_{OUT1} - I_{OUT2}$ that is proportional to the product of the function result and the weight (positive or negative) is obtained as follows:

$$I_{OUT1} - I_{OUT2} = (I_{E1} - I_{E2}) \cdot \tan h\{(V_{IN1} - V_{IN2})/2V_T\} \quad (9)$$

While the above nonlinear operation unit of the nonlinear conversion circuits 4 and 7 of the invention is constituted of bipolar transistors, characteristics including a bounded, monotonic function and multiplication can be obtained by using other nonlinear amplifying elements having three or more terminals, such as FETs generally operating as balanced modulators, electron tubes having a remote cutoff characteristic and electron tubes having a variable-μ characteristic.

Figure 8:
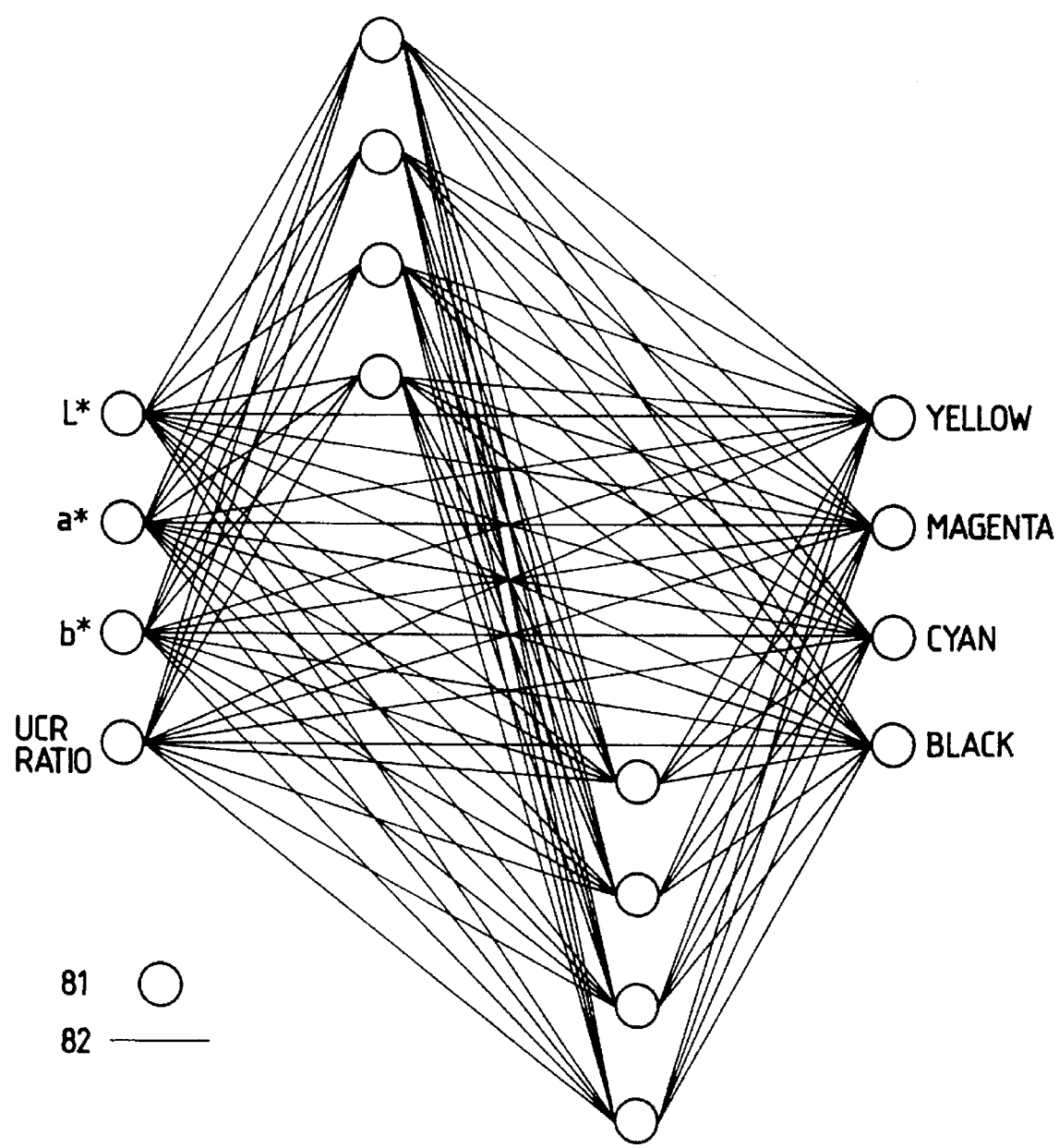
FIG. 8 shows constitution of a nonlinear operation network as a central portion of the nonlinear conversion circuit.
Figure 9:
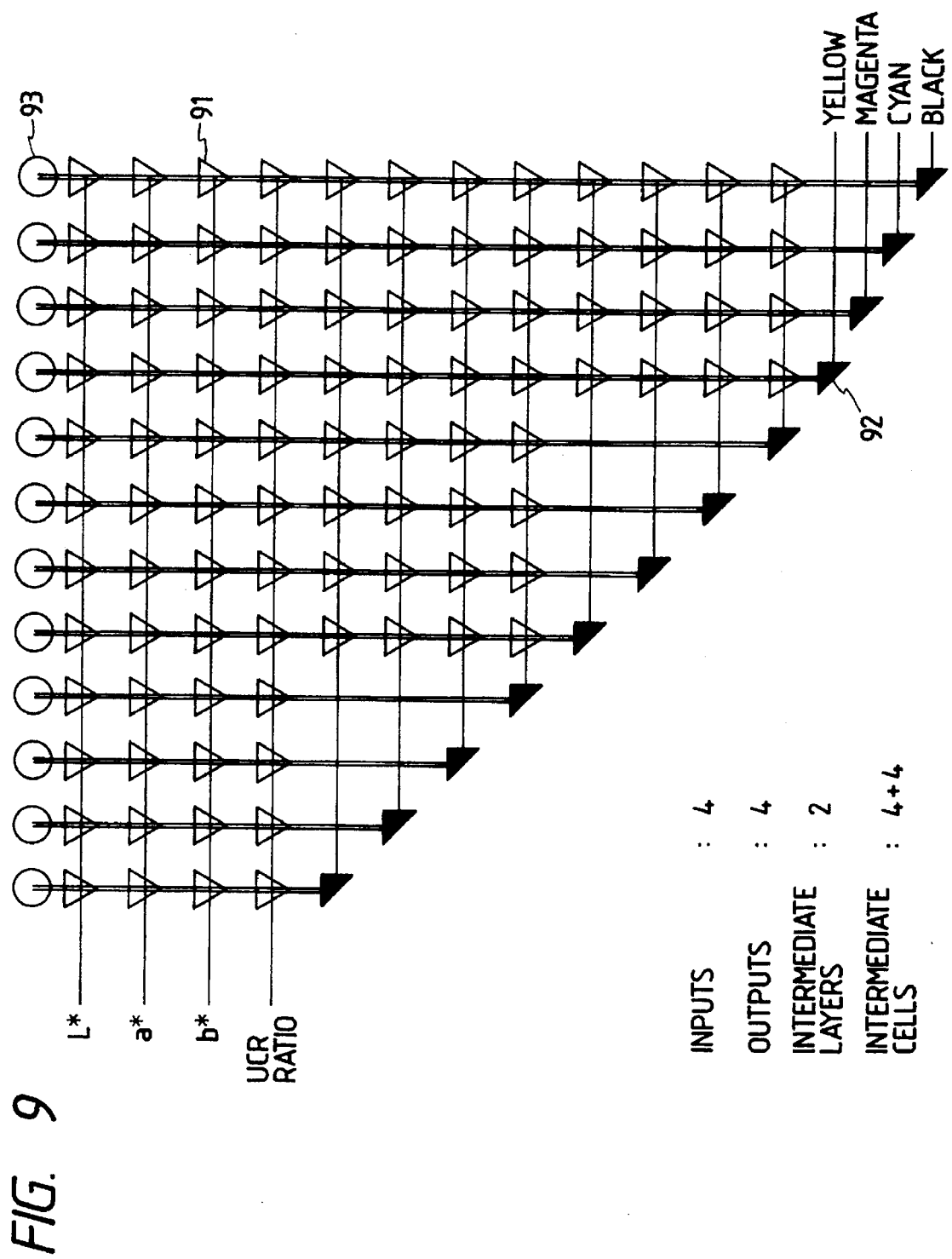
FIG. 9 shows a specific hardware configuration of the nonlinear operation network of FIG. 8.
Figure 10A:
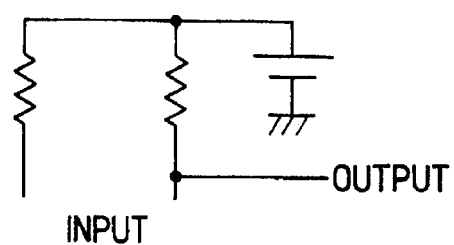
FIGS. 10(a) and 10(b) show a current difference to voltage conversion circuit used in the network of FIG. 9.
Figure 10B:
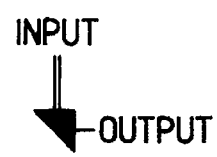
Figure 11A:
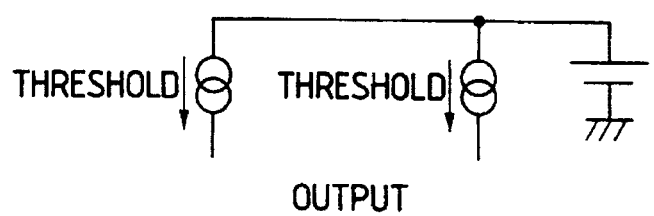
FIGS. 11(a) and 11(b) show a threshold circuit used in the network of FIG. 9.
Figure 11B:
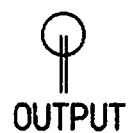

FIGS. 8 and 9 show an embodiment of a central conversion portion of the nonlinear conversion circuits 4 and 7, in which the nonlinear operation units are arranged in a network. In the case of the nonlinear conversion circuit 4, the inputs to the network are the color image signals sent from a workstation etc. and then analog-converted. In the case of the nonlinear conversion circuit 7, the inputs to the network are the UCR ratio α from the UCR ratio calculation means 6 and the analog-converted {L*, a*, b*} signals. In the case of the nonlinear conversion circuit 4, the four outputs are the {L*, a*, b*} signals and a dummy signal. In the case of the nonlinear conversion circuit 7, the outputs are four analog color signals of cyan, magenta, yellow and black. The network includes two intermediate layers and four intermediate cells for each layer. FIG. 8 shows the constitution of the network, in which numeral 81 denotes each nonlinear conversion unit of FIG. 7 and symbol 82 denotes a connection between the units. FIG. 9 shows a circuit configuration to implement the network of FIG. 8. In FIG. 9, unit 91 represents the nonlinear operation unit of FIG. 7, unit 92 represents a current difference to voltage conversion circuit shown in FIGS. 10(a) and 10(b), and unit 93 represents a threshold circuit shown in FIGS. 11(a) and 11(b). This network as a whole can perform a desired input/output conversion that is nonlinear and continuous by optimize in advance the weights of the nonlinear operation units and the thresholds by a method described later.

Since the central conversion portion of the nonlinear conversion circuits 4 and 7 of the invention is a combination of the simple nonlinear operation units as described above, it can presents high processing speed and can produce a plurality of outputs in a parallel manner with a small-size circuit configuration. It can provide much higher conversion accuracy than the conventional matrix-type color conversion by virtue of an increased degree of freedom of parameters. Compared with the polygonal line approximation type conversion (called the direct look-up table type conversion) on a color space in which conversion outputs for representative points on the color space are stored as a table and output values for arbitrary inputs are determined by linear interpolation on representative points in the vicinity of the inputs, the conversion of this embodiment is simpler in circuit constitution and superior in that the continuity and the differential continuity are assured in the input/output conversion.

Figure 12:
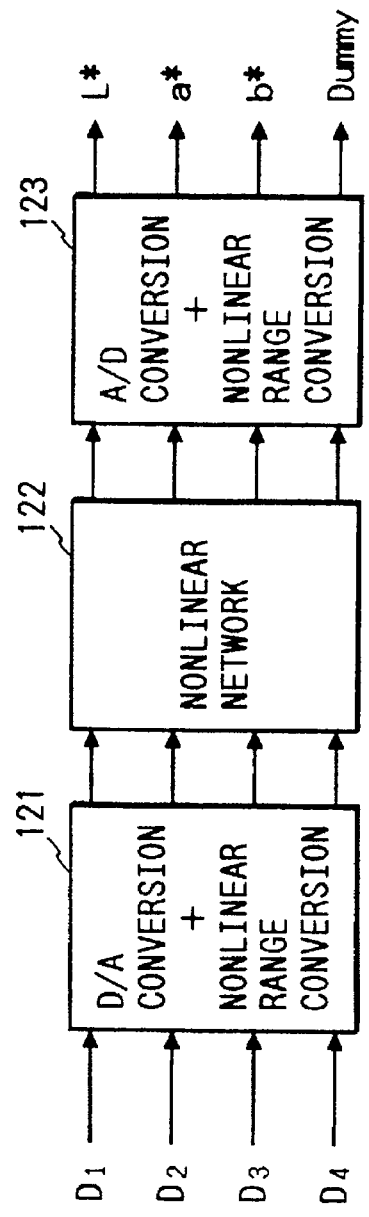
FIG. 12 is a block diagram showing the entire constitution of a nonlinear conversion circuit 4.
Figure 13:
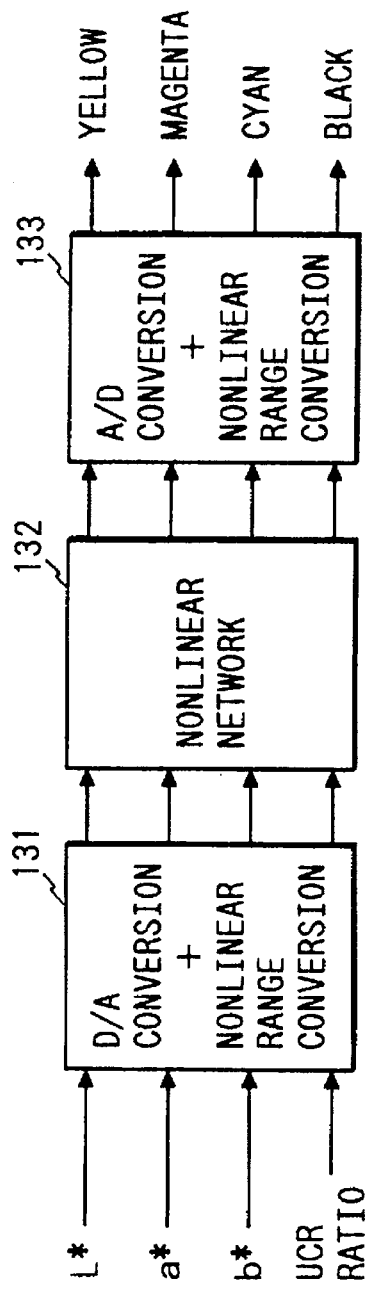
FIG. 13 is a block diagram showing the entire constitution of a nonlinear conversion circuit 7.

Using the above input/output conversion portion as the central conversion portion of the nonlinear conversion circuits 4 and 7, the entire nonlinear conversion circuit 4 and 7 are constructed as shown in FIGS. 12 and 13, respectively. In the nonlinear conversion circuits 4 or 7, a D/A conversion and nonlinear range conversion portion 121 or 131 and an A/D conversion and nonlinear range conversion portion 123 or 133 are provided before and after nonlinear networks 122 or 132 as described above (see FIG. 8), respectively. Thus, the nonlinear conversion circuit 4 outputs the {L*, a*, b*} signals, and the nonlinear conversion circuit 7 supplies the four color recording signals to a recording device. Where the recording device has an analog pulse width modulation means such as a laser, the A/D conversion and nonlinear range conversion portion 133 is not always necessary and may be omitted.

Next, a method of setting the weights and thresholds of the nonlinear conversion circuits 4 and 7 is described. Basically, the same weight setting method can be employed in the nonlinear conversion circuits 4 and 7. For example, the back propagation method, which is known in the neural network theory, can be used as the optimizing method. In the back propagation method, desired outputs for inputs are given in advance as teacher signals and differences between actual outputs and the teacher signals are converted by using a certain function to an energy. The weights and thresholds are repeatedly converted until the energy decreases for a predetermined set of outputs and reaches 0 or is saturated. Since the energy function includes the weights and thresholds and every step of the conversion process is a combination of continuous functions, multiplications and additions, the energy function can be differentiated by the weights and thresholds (variables). Using the differentiated functions, the energy function can be decreased by changing the weights and thresholds so that the energy function decreases.

First the method of setting the weights and the thresholds for the conversion from the {L*, a*, b*} signals to the CMYK signals using the above technique in the nonlinear conversion circuit 7 is described, and then the method of setting the weights and the thresholds for the conversion from the input color signals to the {L*, a*, b*} signals using the above technique in the nonlinear conversion circuit 4 is described.

Figure 14:
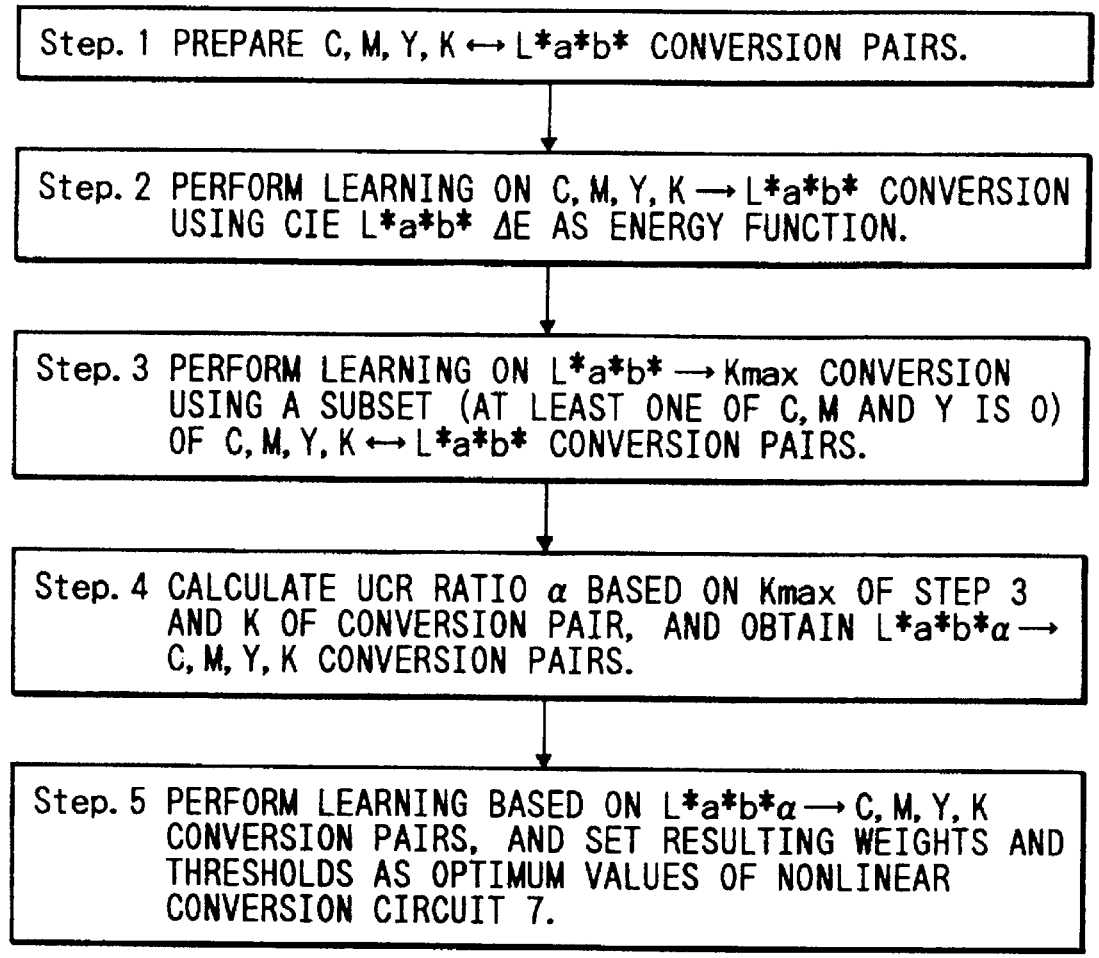
FIG. 14 is a flowchart showing a procedure executed by the nonlinear conversion circuit 7.

Referring to FIG. 14, we explain the procedure of optimizing the weights and thresholds of the nonlinear conversion circuit 7 of this embodiment.

Step 1

Conversion pairs between C,M,Y,K and L*a*b* are prepared in this step.

Known four color recording signals (C, M, Y, K) are input to a subject recording device to produce an actual color print sample. The color of the color printed sample is measured by a colorimeter on the market or the input device of the invention (a corresponding relationship with the L*a*b* signals is known) to produce L*a*b* signals. N (=$P_4$, for instance) input/output pairs of the above conversion are prepared considering the nonlinearity of the recording device.

Step 2

In this step, learning is performed on the conversion from C,M,Y,K to L*a*b* using CIE L*a*b* ΔE as the energy function.

Learning is performed according to the back propagation method using the C,M,Y,K signals and the measured L*a*b* signals of the N conversion pairs prepared in Step 1 as the input and output teacher signals, respectively. Using CIE L*a*b* ΔE, the energy function is defined as follows:

$$E=\Sigma\{(L^{*}-L^{*'})^2+(a^*-a^{*'})^2+(b-b^{*'})^2\}^{1/2} \quad (10)$$

where L*', a*' and b*' are prediction output values (nonlinear).

Step 3

In this step, learning is performed on the conversion from L*a*b* to Kmax using a subset of the conversion pairs between C,M,Y,K and L*a*b*.

A subset in which at least one of C,M and Y is 0 is extracted from the conversion pairs between C,M,Y,K and L*a*b* prepared in Step 1. Learning is performed for the subset according to the back propagation method using the L*a*b* signals as the input teacher signals and the K signal as the output teacher signal. Since all the K signals of the subset are for the reproduction of 100% UCR ratio, this conversion provides the maximum value Kmax of the settable K signal while conserving the given L*a*b* signal colorimetrically. The energy function E is defined as follows:

$$E=\{\Sigma(K\text{max}-K\text{max}')^2\}^{1/2} \quad (11)$$

where Kmax' is a prediction output value.

Alternatively, L*a*b* and L*'a*'b*' are respectively calculated from C,M,Y,Kmax and C,M,Y,Kmax' using the conversion obtained in Step 2, the energy function E is defined as a distance in a color difference space such that:

$$E=\Sigma\{(L^*-L^{*'})^2+(a^*-a^{*'})^2+(b^*-b^{*'})^2\}^{1/2} \quad (12)$$

Step 4

In this step, learning is performed on the conversion from L*a*b*α to C,M,Y,K by calculating the UCR ratio α based on Kmax of Step 3 and K of Step 1.

First, Kmax is obtained for L*a*b* using the optimum conversion obtained in Step 3. On the other hand, by referring to the K signal of C,M,Y,K that corresponds to L*a*b*, the UCR ratio α is obtained as follows:

$$\alpha = K/K\text{max} \quad (13)$$

New conversion pairs between L*a*b*α and C,M,Y,K are obtained by subjecting all of the N conversion pairs of Step 1 to the above operation.

Step 5

In this step, learning is performed based on conversion pairs from L*a*b*α to C,M,Y,K and the resulting weights and thresholds are set as optimum values of the nonlinear conversion circuit 7.

The energy function E is defined as follows:

$$E=\Sigma\{(C-C')^2+(M-M')^2+(Y-Y')^2+(K-K')^2\}^{1/2} \quad (14)$$

where L', M', Y' and K' are prediction output values

Alternatively, L*a*b* and L*'a*'b*' are respectively calculated from C,M,Y,Kmax and C,M,Y,Kmax' using the conversion obtained in Step 2, the energy function E is defined as a distance in a color difference space such that:

$$E=\Sigma\{(L^*-L^{*'})^2+(a^*-a^{*'})^2+(b^*-b^{*'})^2\}^{1/2} \quad (15)$$

Learning is performed according to the back propagation method using L*a*b*α as the input teacher signals and C,M,Y,K as the output teacher signals. If the energy function of Eq. (15) is employed, the optimum weights and thresholds which minimize the energy function E of Eq. (10) are set as optimum values of the nonlinear conversion circuit 7. Similarly, the latter may be approximated using Eq. (14).

The weights and thresholds of the nonlinear conversion circuit 7 are determined by performing the above steps, and the L*a*b* signals are converted to desired color recording signals by the apparatus of FIG. 1. The above optimization process is practiced in a manner depending on the stability etc. of a recording device. If the recording device is very stable, the above steps may be performed preliminarily and the resulting weights and thresholds may be stored as characteristic values. On the other hand, if the recording device is not stable, part or all of the above learning process may be incorporated, as one of its functions, into a color copier which is equipped with the color image processing apparatus of the invention. For example, the following procedure may be employed. In a particular mode of color copier, known four color recording signals (C,M,Y,K) are stored in a memory of the copier and then output as a test print. The test print is read by an input device of the copier to produce L*a*b* signals. Then, the operations to Step 5 are executed by software of the copier and the results are stored in a predetermined memory. With this constitution, a variation of the characteristics of the recording device due to environmental variations can be compensated at a proper timing, so that color prints can be always produced in a stable manner.

Next, a method of optimizing the weights and thresholds of the nonlinear conversion circuit 4. With the nonlinear conversion circuit 4, the weights and thresholds for conversion from arbitrary input signals to the {L*, a*, b*} signals are set in the weight memory 3. The manner of setting the weights and thresholds depends on whether the kind of color data ($D_{fig}$) is known. Where it is known, the optimization of the weights and thresholds may be performed on a off-line basis and it suffices that only the results of the above-described processing according to the back propagation method are set in the weight memory 3. In this case, the results can be obtained by performing a procedure of FIG. 15 off-line. For example, in the case of color input signals (DIC-approved) where the color matching is DIC and the color space is CMYK (see the application programs of FIG. 2), 1,000-plus printing standard color samples are defined. Therefore, the process can be effected properly by preliminarily performing the learning operation using those samples as the teacher data and setting learning results in the weight memory 3.

Figure 15:
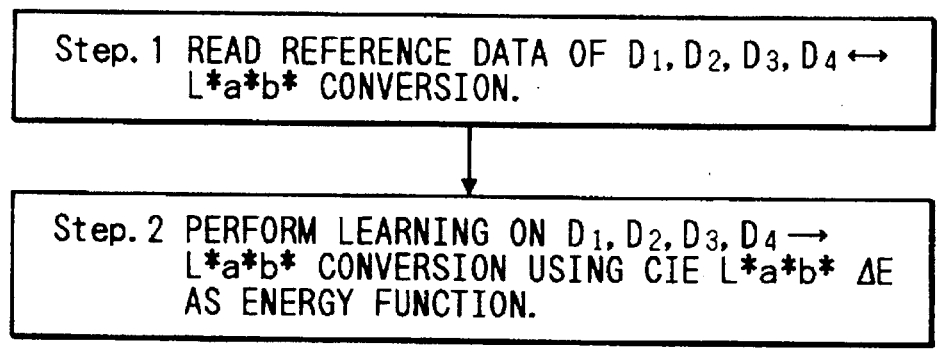
FIG. 15 is a flowchart showing a procedure executed by the nonlinear conversion circuit 4.

On the other hand, where the kind of color data ($D_{fig}$) is not known, the reference data $T_{dat}$ is input to the learning means 2 and the weights and thresholds are optimized on-line according to the procedure of FIG. 15, which is the same as in the case where the kind of color data ($D_{fig}$) is known. While the back propagation method can be used as the optimization method, other known learning methods may be employed to provide higher efficiency. In the actual process of learning, cumbersome calculations are necessary of the above-described energy function is differentiated. Therefore, it is a general procedure that learning is performed so as to decrease the energy for each pair of the input signal and the teacher signal. In the back propagation method, it may be the case that the error takes an extreme rather than a minimum. It is known that this phenomenon is effectively avoided by adding proper noise to the respective weights and thresholds in the learning process.

Although the above description is directed to the nonlinear conversion circuits using the back propagation method, any systems based on the neural network theory which enable teacher association type learning can be used as the nonlinear conversion circuit of the invention.

Although the above description is directed to the case where plural, different kinds of input color signals are converted to image recording signals of a single output device, the nonlinear conversion circuit 7 may be so modified as to accommodate plural, different output devices. That is, another weight memory 9 (shown by a dotted line in FIG. 1) is provided to store information for defining conversions from L*a*b*α to Yout,Mout,Cout,Kout of the number of output devices to be connected to the apparatus of the invention. In response to an external signal $P_{sel}$ to select a desired output device, the information for defining the corresponding conversion is read from the weight memory 9 and set in the nonlinear conversion circuit 7. Thus, it becomes possible to select among a plurality of output devices having different characteristics, for instance, printers.

As described above, the invention provides the color conversion process which can accommodate plural, different kinds of input color signals. In particular, with the constitution which can even accommodate, by self-learning, input color signals whose conversion relationships with a colorimetric color coordinate system are not defined, it becomes possible to connect to various color image devices that are or will be put into practice in a wide range of technical fields, to thereby enable desired color reproduction required by various color image devices.

With the constitution which enables the UCR adjustment for image quality improvements (e.g., improvement of texture, stabilization of gray reproduction and reduction of graininess of memory colors) taking into account the characteristics of a recording device, it becomes possible to improve the output image quality itself as well as assure faithful color reproduction.

According to the invention, by virtue of the use of three iso-perceptive color signals on a uniform color space, every processing step is constructed to be device-independent and is performed using iso-perceptive lightness/chromaticity separation signals that well match the human perception. Therefore, the invention can be applied to a variety of image recording devices irrespective of their types and necessary adjustments are performed in a manner compatible with the human perception.

Further, since the apparatus of the invention includes the nonlinear conversion circuit in the form of a combination of simple nonlinear operation units, it can operate at high speed and the four color parallel output processing can be realized by a small-size circuit configuration. The invention can provide much higher conversion accuracy than the conventional matrix-type color conversion by virtue of an increased degree of freedom of parameters. Compared with the polygonal line approximation type conversion (called the direct look-up table type conversion) on a color space in which conversion outputs for representative points on the color space are stored as a table and output values for arbitrary inputs are determined by linear interpolation on representative points in the vicinity of the inputs, the conversion of the invention is superior in that the size of the memory of conversion coefficients for plural kinds of input color signals is very small, and that the continuity and the differential continuity are assured in the input/output conversion to prevent quasi-outlines as would occur in reproducing an image including subtle color gradation in computer graphics etc.

Having the above advantages, the color image processing apparatus of the invention can be applied suitably to a wide variety of apparatuses such as a printing scanner, video printer, digital color copier and a color-proof system.

What is claimed is:

1. A color image processing method comprising the steps of:
   receiving input color signals;
   determining the type of the received input color signals, which type can be one among a plurality of input color signal types, each of the plurality of input color signal types comprising a set of color signals used to identify color information in a corresponding color space;
   storing in a storing means conversion coefficients for converting each of a plurality of input color signal types into a uniform color signal type in a uniform color space;
   retrieving the conversion coefficients for the determined type of the received input color signals from the storing means
   converting the received input color signals to three intermediate color signals of the uniform color signal type in the uniform color space using the retrieved conversion coefficients; and
   converting the three intermediate color signals of the uniform color signal type in the uniform color space to image recording signals of four colors including black.

2. The method of claim 1, wherein the retrieving step includes a step of learning the conversion coefficients for converting each of a plurality of types of received input color signals for which conversion coefficients are not stored in the storing means into the uniform color signal type in the uniform color space based on plural sets of teacher signals for each of the plurality of types of the received input color signals for which conversion coefficients are not stored in the storing means.

3. The method of claim 2, wherein at least part of operations of each converting step are performed by a combination of functions each comprising:
   applying a nonlinear conversion to a plurality of inputs;
   multiplying results of the nonlinear conversion by respective weights; and
   adding up results of the multiplying step.

4. The method of claim 1, wherein the step of converting the three intermediate color signals in the uniform color space includes:
   determining a chroma signal based on the intermediate color signals in the uniform color space;
   determining an under color removal ratio based on the chroma signal; and
   determining the image recording signals of four colors based on the three intermediate color signals in the uniform color space and the under color removal ratio.

5. A color image processing apparatus comprising:
   storage means for storing respective sets of information related to conversion coefficients for each of a plurality of color signal types, each of the color signal types comprising a set of color signals used to identify color information in a corresponding color space;
   means for receiving input color signals;
   means for determining the type of the received input color signals;
   means for retrieving from the storage means the respective set of information stored in the storage means for the determined type of the received input color signals;
   first converting means for converting the received input color signals to three intermediate color signals of a uniform color signal type in a uniform color space using the retrieved set of information; and
   second converting means for converting the three intermediate color signals of the uniform color signal type in the uniform color space to image recording signals of four colors including black.

6. The apparatus of claim 5, wherein the first converting means comprises:
   nonlinear conversion means for converting the received input color signals into the three intermediate color signals in the uniform color space, said nonlinear conversion means being settable for converting at least some color signal types of the plurality of color signal types; and
   means for setting the nonlinear conversion means prior to input of the input color signals by using a retrieved set of information based on expected input color signals.

7. The apparatus of claim 6, wherein the first converting means further comprises learning means for determining a set of information related to conversion coefficients when no set of information for the selected input color signal type is stored in the storage means, said learning means performing a learning operation in cooperation with the nonlinear conversion means based on plural sets of teacher signals, and for storing the determined set of information in the storage means.

8. The apparatus of claim 5, wherein at least one of the first and second converting means comprises a network circuit including a plurality of nonlinear operation units connected to each other.

9. The apparatus of claim 8, wherein each of the nonlinear operation units comprises:

means for applying a nonlinear conversion to a plurality of inputs;

means for multiplying results of the nonlinear conversion by respective weights; and means for adding up results of the multiplications, and further adding a threshold to a sum of the multiplication results.

10. The apparatus of claim 9, wherein a combination of the nonlinear conversion applying means and the multiplying means is formed by an analog circuit, and wherein a unit circuit of the analog circuit comprises a differential amplifier having a pair of three-terminal amplifying elements having respective first terminals connected to each other and supplied with a current proportional to the weight, respective second terminals between which a voltage difference proportional to the input is applied, and respective third terminals a difference between currents flowing through which terminals serves as an output.

11. The apparatus of claim 9, wherein a combination of the nonlinear conversion applying means and the multiplying means is formed by an analog circuit, and wherein a unit circuit of the analog circuit comprises:

a first differential amplifier having first and second three-terminal amplifying elements having respective first terminals connected to each other to form a first weight terminal;

a second differential amplifier having third and fourth three-terminal amplifying elements having respective first terminals connected to each other to form a second weight terminal;

a first input terminal being a connection of respective second terminals of the first and fourth three-terminal amplifying elements;

a second input terminal being a connection of respective second terminals of the second and third three-terminal amplifying elements;

a first output terminal being a connection of respective third terminals of the first and third three-terminal amplifying elements; and a second output terminal being a connection of respective third terminals of the second and fourth three-terminal amplifying elements, wherein a voltage difference proportional to the input is applied between the first and second input terminals, and a current difference proportional to the weight is applied between the first and second weight terminals, so that a difference between currents flowing through the first and second output terminals serves as an output that is proportional to a product of a result of applying a bounded, monotonic function to the input and the positive or negative weight.

12. The apparatus of claim 5, wherein the second converting means comprises:

means for determining a chroma signal based on the three intermediate color signals of the uniform color type in the uniform color space;

means for determining an under color removal ratio based on the chroma signal; and means for determining the image recording signals of four colors based on the three intermediate color signals and the under color removal ratio.

13. The apparatus of claim 12, wherein the under color removal ratio determining means comprises:

means for receiving adjusting parameters $(C^*_1, Ak_1)$ and $(C^*_2, Ak_2)$; and means for determining the under color removal ratio $\alpha$ according to a function $\alpha = Ak_1$ for $C^* < C^*_1$ $\alpha = (C^* - C^*_1)(Ak_2 - Ak_1)/(C^*_2 - C^*_1) + Ak_1$ for $C^*_1 \leq C^* < C^*_2$ $\alpha = Ak_2$ for $C^*_2 \leq C^*$ where $C^*$ is the chroma signal.

14. The apparatus of claim 12, wherein the under color removal ratio determining means comprises:

means for receiving adjusting parameters $(C^*_1, Ak_1)$ and $(C^*_2, Ak_2)$; and means for determining the under color removal ratio $\alpha$ according to a function $\alpha = Ak_2 + (Ak_1 - Ak_2)[1 - \tan h\{(\pi/2)(C^* - a)/b\}]/2$ $a = (C^*_1 + C^*_2)/2$ $b = (C^*_2 + C^*_1)/2$ where $C^*$ is the chroma signal and $\alpha$ is fixed at 1 when the above equation takes a value larger than 1 and at 0 when the above equation takes a negative value.

15. The apparatus of claim 12, wherein the first converting means comprises nonlinear conversion means for converting the input color signals into the three intermediate color signals of the uniform color type in the uniform color space; and the second converting means comprises:

second storage means for storing respective sets of information for converting the three intermediate color signals of the uniform color type in the uniform color space to any of a plurality of image recording signal types, each of the image recording signal types corresponding to image recording signals used to identify recording color information;

second nonlinear conversion means for converting the three intermediate color signals of the uniform color type in the uniform color space into image recording signals of an image recording signal type for a corresponding recording device; and means for setting the second nonlinear conversion means prior to input of the input color signals by reading a set of the information stored in the second storage means, which set of information corresponds to the image recording signal type for the corresponding recording device.

* * * * *